Dec. 10, 1935.   L. H. STANFORD   2,023,493
DRIVING MECHANISM FOR MOTION PICTURE CAMERAS
Filed April 29, 1933
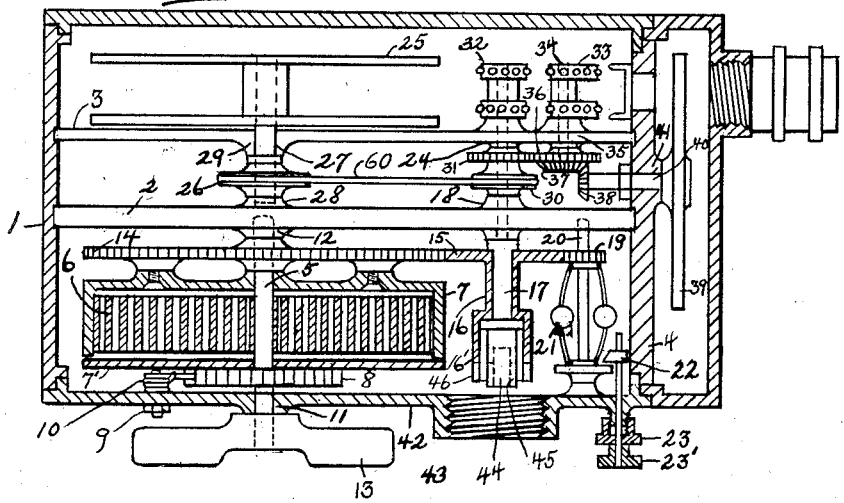
INVENTOR
Leland H. Stanford.
By
ATTORNEY Patented Dec. 10, 1935

2,023,493

UNITED STATES PATENT OFFICE 2,023,493

DRIVING MECHANISM FOR MOTION PICTURE CAMERAS

Leland H. Stanford, United States Army, Fort Shafter, Territory of Hawaii

Application April 29, 1933, Serial No. 668,536

8 Claims. (Cl. 88—17)

(Granted under the act of March 3, 1883, as amended April 30, 1928; 370 O. G. 757)

This invention described herein may be manufactured and used by or for the Government for governmental purposes, without the payment to me of any royalty thereon.

In general this invention relates to motion picture cameras, but more particularly to a coupling for uniting a source of power to the intermittent mechanism for moving the film and shutter.

One object of the invention is to provide a means for changing the source of power by which the camera is operated, that is, from spring motor to electric motor, or to manual operation.

Another object is to provide a motion picture camera in which the film mechanism can be driven in either direction independently of the spring motor and one in which the spring tension may be released during periods of idleness without exposing the film in the camera.

Another object of the invention is to provide a means which will guard against the accidental operation of the camera and thus prevent the wasting of films, and Still another object of the invention is to provide a means for driving auxiliary mechanism in synchronism with the camera mechanism such as a dissolving device, or other light mechanisms.

Briefly stated, the device which forms the subject matter of this invention consists in providing a motion picture camera or projector with a novel coupling interposed between the motor and the transmission gears, which drives the intermittent film mechanism and operates the shutter. In present practice this connection is either direct or through a ratchet. The present spring driven camera mechanism, in instances where it is also designed to permit manual operation, is limited to be operated manually only in the forward direction, whereas in a camera equipped with this novel coupling, it is possible to operate a spring motor camera either manually or with an electric motor at any desired speed and in either direction.

In this construction it is not necessary to alter the ordinary drive mechanism of the camera, since a sleeve is interposed between the spring motor and camera mechanism. This sleeve is rotated by the motor and surrounds the shaft which operates the camera mechanism. When it is desired to operate the camera with the spring motor, the drive between the sleeve and shaft is completed by a removable key which functions as a coupling pin. When the key is in place the sleeve and shaft turn in unison and when the key is removed the spring motor may be released without operating the camera and the camera may be operated in either direction from an external source, by the use of a key which connects only with the camera mechanism. This second type of key may terminate in a crank for manual operation of the camera or it may have a pulley attached thereto for connection with an electric motor. The key may also be constructed to operate external mechanism in synchronism with the camera mechanism by the action of the camera motor.

In order that the invention may be more readily understood, reference is had to the accompanying drawing which forms a part of this specification.

Fig. 1 is a top plan view partially in section of the improved type of motion picture camera, showing the spring motor and coupling members and a portion of the film operating mechanism;

Fig. 2 is a partial sectional view showing the coupling members, and coupling key with long cross pin, adjusting knob and retaining cap;

Fig. 3 is a view similar to Fig. 2 with the exception that in this figure the coupling key is provided with a short cross pin and a crank;

Fig. 4 is a view similar to the preceding Figures 2 and 3 with the exception that in this figure the coupling key is provided with a long cross pin and a pulley, and Fig. 5 is a partial sectional view showing the coupling key with retaining cap. In this view the coupling key is provided with a short cross pin and a pulley.

With particular reference to the drawing, the numeral (1) indicates the housing of the camera mechanism. This housing is divided into four compartments by the three dividing walls (2), (3), and (4) which function as bearing supports for the various shafts required for the motor, film spools, and shutter.

The spring motor, which may be connected to the intermittent film mechanism through a specially designed coupling key, comprises a central winding shaft (5), a coil spring (6), a spring casing (7), and a ratchet (8) which is rigidly attached to the winding shaft (5), and a pawl (9) and a pawl spring (10), both of which are attached to the housing. Spring casing (7) is further enclosed by the cover disc (7') attached to the ratchet (8). The winding shaft (5) is mounted in bearings (11) and (12) located in the housing (1) and the wall (2). To the external portion of the shaft (5) extending outside of the housing (1) is attached the winding key (13). This spring motor is of the usual construction in which the winding of the spring revolves a gear train operatively connected to the mechanism to be driven. In the motor shown, the pawl (9) prevents rotation in one direction of the winding shaft (5); so that the unwinding of the spring (6) rotates the spring casing (7), and with it the gear (14). This gear (14) is in mesh with a second gear (15) formed either integral with or attached to a rotatable sleeve member (16). This rotatable sleeve member (16) is mounted on a central shaft (17), which in turn is rotatably mounted within a bearing (18) formed in the wall (2). The gear (15) preferably formed integral with the sleeve (17) meshes with a third gear (19) mounted on a shaft (20) to which is attached a governor mechanism (21) of the usual type, provided with stop (22), speed control device (23) and stop control knob (23'). Thus the power of the unwinding spring is transmitted from the gear (14) to gear (15) and hence to a third gear (19) which rotates the governor (21).

The central shaft (17) functions as the main drive shaft of the intermittent film mechanism and shutter. This shaft (17) is rotatably mounted in bearings (18) and (24) in the dividing walls (2) and (3).

Only a portion of the film mechanism is shown in Fig. 1. Of the mechanism shown, the numeral (25) designates a film spool removably splined to the shaft (27) which is mounted in bearings (28) and (29) formed in the walls (2) and (3), and concentric with the bearings (11) and (12). To the portion of the shaft (27) intermediate the walls (2) and (3) is attached a pulley (26). To the corresponding portion of the central shaft (17) is also attached a pulley (30) and a gear wheel (31), and to the overhanging portion of this shaft (17), lying within the compartment occupied by the film spool (25) is attached the film sprocket (32). To the corresponding portion of shaft (34) which is mounted in bearing (35) in wall (2) is attached an eccentrically mounted sprocket (33), designed to produce intermittent movement of the film. Power is transmitted to cam (33) from the shaft (17) through the intermeshing gears (31) and (36), and from the shaft (17) to the film spool (25) by means of the pulleys (30) and (26) and the belt (60) which connects the same.

A bevel gear (37) attached to the shaft (34) meshes with a second bevel gear (38) which rotates the shutter (39) mounted on the shaft (40). This shaft is rotatably mounted in a bearing (41) formed in the wall (4).

In the side wall (42) of the housing (1) is located an opening having an internally threaded annular wall. This opening is concentric with and gives access to the end of the central shaft (17) and sleeve (16). The ends of the central shaft and sleeve adjacent this opening are formed in the following manner: The shaft is drilled out centrally to form a cylindrical portion (44) which is slotted longitudinally at (45). The sleeve is also slotted longitudinally at its corresponding extremity, as indicated by the numeral (46). The slotted extremity of the shaft (17) extends slightly beyond the end of the sleeve (16).

The interally threaded annular opening (43), mentioned above, is for the reception of a threaded cap (47) provided with an internal cylindrical guide wall (48). The cap (47) is centrally drilled at (49) for the purpose of journaling a shaft (50) concentric with the guide wall (48) and of such diameter as to fit the interior of the cylindrical portion or counterbore (44) of the shaft (17). At right angles to its axis the shaft (50) is drilled for the reception of a pin (51) of a diameter to fit within the slot (45) of the shaft. The shaft (50) is provided with an inner collar (52) and an outer collar (53) to limit its axial movement with respect to the cap (47) and at the same time to permit rotation of the shaft (50) within the cap.

In the form shown in Fig. 2 the shaft (50) terminates in a knob (54) for turning said shaft (50). The pin (51) in this instance is as long as the diameter of the sleeve (16) at its widest portion (16'), but shorter than the internal diameter of the guide wall (48), and engages in slots (45) of shaft (17) and slots (46) of sleeve (16). In this form the coupling unites the sleeve (16) with the central shaft (17) so that power of the spring motor may be transmitted to the film mechanism and shutter.

In Fig. 3 there is shown a coupling shaft with a cross pin (51') of only sufficient length to engage the longitudinal slots of the central shaft and terminating at its extremity in the form of a crank (57). Since the central shaft and sleeve are not united by this coupling shaft only power from the crank will be transmitted to the film and shutter operating mechanism of the camera. Such a device is to be used when it is desired to operate the camera manually.

In Fig. 4 is shown a coupling shaft having a cross pin (51) similar to that shown in Fig. 2, that is, of sufficient length to unite the central shaft with the sleeve so that power delivered to the sleeve will be transmitted to the central shaft. To the exterior portion of the coupling shaft is mounted a pulley (58). It will be seen that with the use of a coupling of this type the power of the spring motor will be transmitted from the sleeve to the central shaft and to the film and shutter operating mechanism of the camera and that the coupling shaft will rotate with the sleeve and central shaft and consequently the pulley will rotate likewise. A coupling shaft of this design is provided so that auxiliary apparatus may be operated in unison with the movement of a film, such auxiliary apparatus may consist of a dissolving device of any suitable light mechanism which it may be necessary to operate in this manner.

In Fig. 5 is shown a coupling shaft having a cross pin (51') of sufficient length to engage only the central shaft such as is shown in Fig. 3. The exterior portion of the coupling shaft shown in this view terminates in a pulley instead of a crank so that instead of operating manually, it may be operated by an electric motor. In operating the camera in this manner only the central shaft is rotated thus driving the film and shutter mechanism independent of the spring motor. Instead of using a pulley in connection with the coupling shaft in this form any suitable coupling can be used to unite the shaft (17) with an external source of power.

It will thus be seen from the illustrations and from the description given above that in order to change the driving mechanism of the camera, it is only necessary to use coupling shafts of various designs and that the film and shutter mechanism can be driven absolutely independent of the spring motor.

It is to be understood that the above described constructions are only exemplary and may be replaced by mechanical equivalents without departing from the scope of the invention.

Having described my invention, what I claim as new and wish to secure by Letters Patent is:

1. A device of the character specified, the combination of a film operating mechanism, a spring motor, and interrupted drive members interposed between the motor and the film operating mechanism, said interrupted drive members comprising a rotatable shaft, having a slotted tubular extremity, and operatively connected to said film operating mechanism, and a slotted sleeve rotatably mounted on said shaft and operatively connected to said motor, and a detachable coupling key comprising a stem, a pulley rigidly attached to said stem and a cross member adapted to engage the slots in said shaft and said sleeve to effect transmission of power from the spring motor to said film operating mechanism.

2. A device of the character specified, the combination of a film operating mechanism, a spring motor and interrupted drive members interposed between the motor and the film operating mechanism, said interrupted drive members comprising a rotatable shaft having a slotted tubular extremity and operatively connected to said film operating mechanism, a slotted sleeve rotatably mounted on said shaft and operatively connected to said motor, and a detachable element forming a driving connection interposed between said interrupted drive members adapted to effect transmission of power from the motor to said film operating mechanism.

3. A device of the character specified, the combination of a film operating mechanism, a spring motor and interrupted drive members interposed between the motor and the film operating mechanism, said interrupted drive members comprising a rotatable shaft, having a slotted tubular extremity, and operatively connected to said film operating mechanism, and a slotted sleeve rotatably mounted on said shaft and operatively connected to said motor, and a detachable element forming a driving connection between said interrupted drive members adapted to effect transmission of power to said film operating mechanism.

4. A device of the character specified, the combination of a film operating mechanism, a spring motor and interrupted drive members interposed between the motor and the film operating mechanism, said interrupted drive members comprising a rotatable shaft having a slotted tubular extremity and operatively connected to said film operating mechanism, a slotted sleeve rotatably mounted on said shaft and operatively connected to said motor, and a detachable coupling key comprising a stem, and a cross-member fitted within said stem adapted to engage the slots in said shaft and said sleeve to effect transmission of power from the spring motor to said film operating mechanism.

5. In a device of the character specified, the combination of a film operating mechanism, a spring motor, interrupted drive members interposed between the motor and the film operating mechanism, said interrupted drive members comprising a central shaft having a longitudinally slotted tubular end and a similarly slotted concentric sleeve rotatably mounted on said shaft, and a detachable coupling member comprising a central rotatable stem, and a cross-member fitted within said stem adapted to engage the slots in said shaft and sleeve to effect the transmission of power from said motor to said film operating mechanism through said drive members.

6. A device of the character specified, the combination of a film operating mechanism, a spring motor and interrupted drive members interposed between the motor and the film operating mechanism, said interrupted drive members comprising a rotatable shaft having a slotted tubular extremity and operatively connected to said film operating mechanism, a slotted sleeve rotatably mounted on said shaft and operatively connected to said motor, a detachable coupling key comprising a rotatably mounted central stem projecting partially within the tubular extremity of the rotatable shaft and a cross-member adapted to engage the slots in said shaft and said sleeve to effect transmission of power from the spring motor to said film operating mechanism.

7. A device of the character specified, the combination of a film operating mechanism, a spring motor and interrupted drive members interposed between the motor and the film operating mechanism, said interrupted drive members comprising a rotatable shaft having a slotted tubular extremity and operatively connected to said film operating mechanism, a slotted sleeve rotatably mounted on said shaft and operatively connected to said motor, a detachable coupling key comprising a rotatably mounted central stem projecting partially within the tubular extremity of the rotatable shaft, said stem being provided with a cross-member adapted to engage the slots of the shaft and said sleeve to effect transmission of power from the spring motor to said film operating mechanism and a power transmitting element rigidly attached to the outer extremity of said stem.

8. A device of the character specified, the combination of a film operating mechanism, a spring motor and interrupted drive members interposed between the motor and the film operating mechanism, said interrupted drive members comprising a rotatable shaft having a slotted tubular extremity and operatively connected to said film operating mechanism, a slotted sleeve rotatably mounted on said shaft and operatively connected to said motor, a detachable coupling key comprising a rotatably mounted central stem projecting partially within the tubular extremity of the rotatable shaft and a cross-member adapted to engage the slots of said interrupted drive members and a power transmission element in connection with the outer extremity of said central stem.

LELAND H. STANFORD.